Aug. 5, 1941.   C. R. REUTER ET AL   2,251,804
FLEXIBLE COUPLING
Filed Aug. 1, 1938
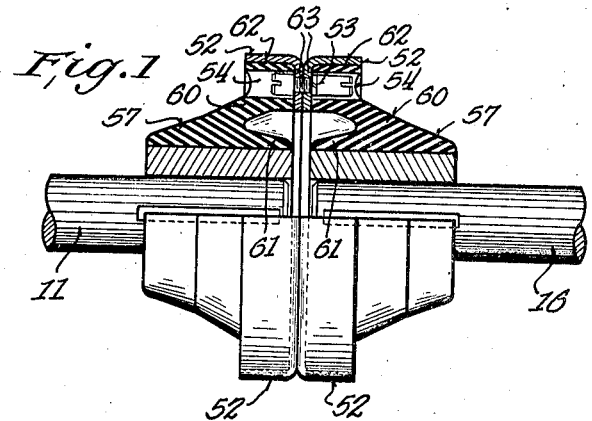
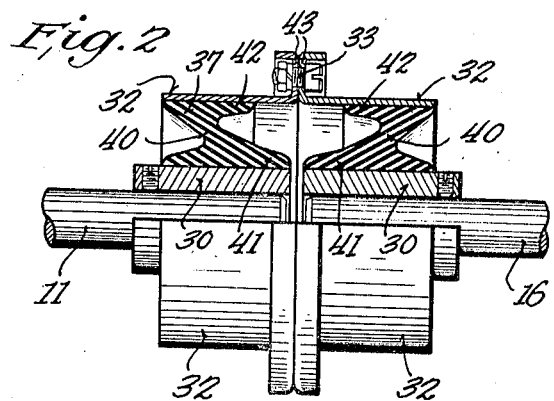
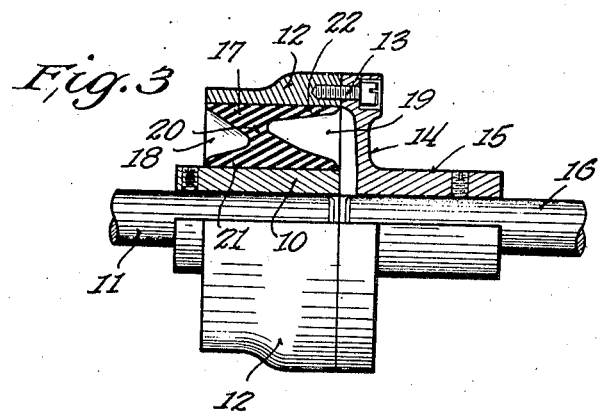
INVENTORS
THOMAS L. FAWICK
CARL R. REUTER
BY
ATTORNEY.

Patented Aug. 5, 1941

2,251,804

UNITED STATES PATENT OFFICE 2,251,804

FLEXIBLE COUPLING

Carl R. Reuter, Milwaukee, Wis., and Thomas L. Fawick, Akron, Ohio; said Reuter assignor to The Falk Corporation, Milwaukee, Wis., a corporation of Wisconsin Application August 1, 1938, Serial No. 222,432

8 Claims. (Cl. 64—11)

This invention relates to power transmitting couplings of a type wherein flexibility is afforded by the inclusion of a yieldable or resilient torque transmitting annulus of rubber or rubber-like composition.

An object of the present invention is to provide in a coupling of this type a torque transmitting annulus so formed and arranged as to readily accommodate angular and parallel misalignment between the coupled shafts with a minimum of internal friction within the material of the annulus.

Another object is to provide in a coupling of this type an annulus so formed and arranged as to carry a maximum torque load without buckling and yet possessing flexibility of a kind capable of accommodating a relatively high degree of both angular and parallel misalignment between the coupled shafts.

Another object is to provide a low cost flexible coupling of the yieldable torque transmitting annulus type capable of transmitting a maximum torque load for a given external diameter.

Another object is to provide a novel combination and arrangement of two annuli in a coupling of the type mentioned thereby to attain a maximum degree of angular flexibility.

Other more specific objects and advantages of the present invention will appear, expressed or implied, from the following description of three illustrative embodiments thereof.

In the accompanying drawing:

Figure 1 is an axial sectional view, partly in elevation, of a flexible coupling embodying the present invention.

Fig. 2 is a similar view of a modified form of coupling constructed in accordance with this invention.

Fig. 3 is a similar view of another form of coupling embodying this invention and including only a single rubber or rubber-like annulus.

The simpler form of coupling shown in Fig. 3 will first be described. It includes an inner metallic hub or sleeve 10 removably fixed to one shaft 11, and an encircling outer metallic ring 12 substantially concentric with but radially spaced from the hub 11. In this instance the outer ring 12 is rigidly but removably attached by bolts 13 or the like to a disk 14, carried by an appropriate hub 15 which is removably fixed to an adjacent shaft 16. Hub 10 is thus rigid with respect to and rotatable with shaft 11, while the outer ring 12 is rigid with respect to and rotatable with the other shaft 16, it being understood that in the three couplings shown either of the shafts 11 or 16 may be the drive shaft and the other the driven shaft.

In the coupling of Fig. 3 the outer ring 12 is connected to the inner hub 11 solely through a torque transmitting rubber annulus 17 of novel form, particularly designed to possess a high degree of torsional stiffness or stability and at the same time a high degree of flexibility of a kind to readily accommodate angular and parallel misalignment between the coupled shafts 11 and 16. It will be noted that the annulus 17 contains two inwardly tapered annular recesses 18 and 19, which extend inwardly from opposite faces of the annulus with their narrow bases spaced and radially offset in a manner to form a relatively narrow inclined web portion 20 therebetween. This web 20 thus formed extends diagonally outward from an inner annular flange or shoe 21 and merges into a similar outer shoe 22 to form a substantially conical connector therebetween.

The inner shoe 21 is preferably surface bonded to the hub 10, as by vulcanizing the same thereto, so as to provide a secure union therewith, and the outer shoe 22 is similarly joined to the outer ring 12. It will be noted that the shoes 21 and 22 are axially extended to present relatively large bonded areas to the hub 10 and ring 12, respectively, so as to afford ample gripping power to sustain the torque loads. It will also be noted that the conical form of connecting web 20 is highly resistant to torsional distortion and thus well able to sustain and transmit relatively heavy torque loads, yet it yields readily to relative displacements between the hub 11 and ring 12 of a kind which ordinarily result from parallel or angular misalignment between the shafts 11 and 16.

In the coupling of Fig. 3 the shafts may be readily uncoupled merely by withdrawing the bolts 13 so as to release the ring 12 from the disk 14.

The coupling shown in Fig. 2 includes two rubber annuli 37 which are reverse counterparts of each other, both being of a design similar to the annulus 17 of the coupling of Fig. 3. Each annulus 37 has an inner annular shoe 41 surface bonded to an inner hub 30 on one of the shafts 11 or 16, an outer annular shoe 42 surface bonded to an outer surrounding ring 32, and an intermediate conical web 40 connecting the shoes. In this instance the two outer rings 32 are separably joined by bolts 33 or the like to form a rigid unitary structure floatably supported at opposite ends by the rubber annuli.

With the parts thus arranged, angular misalignment between the shafts is accommodated by a tilting of the ring structure 32—32 through an angle equal to one half of the angular misalignment, and parallel misalignment is also accommodated by a tilting of the ring structure 32—32 to a degree which is minimized by a wide axial spacing between the points of support of the ring structure. That is to say, since the webs 40 of the two annuli slope outwardly toward the ends of the axially extended ring structure 32—32, tilting of that structure as a result of parallel misalignment is reduced to a minimum, with a consequent minimum deflection of the annuli as a result of such misalignment.

With the coupling of Fig. 2, the shafts are readily releasable simply by withdrawal of the bolts 33. However, to render those bolts readily accessible, they are mounted in outwardly directed flanges 43 on the adjacent ends of rings 32, which thus increase the diameter of the coupling.

The coupling shown in Fig. 1 is similar in many respects to that of Fig. 2, but involves a novel combination and arrangement of parts by which highly desirable compactness is attained without sacrificing torque carrying capacity or flexibility. It comprises two rubber annuli 57, each having a conical web 60, extending outwardly from an inner annular shoe 61 surface bonded to an inner hub 50, and merging into an outer annular shoe 62 surface bonded to an outer ring 52. In this instance, however, the rings 52 are rather narrow, as compared with those of Fig. 2, and are provided with inwardly directed flanges 63, each of which is also surface bonded to the outer shoe 62 of the connected annulus, thereby to obtain bonded areas of sufficient total extent to sustain the torque loads.

In this instance the rings 52 are rigidly but separably joined by appropriate bolts 53 extending through the inturned flanges 63 and rendered accessible by perforations 54 preferably molded in the outer shoes 62 of the annuli.

It will of course be understood that in the several couplings shown, the annuli described may be made of natural or synthetic rubber, or any suitable rubber-like composition capable of sustaining the torque loads and of affording the desired flexibility, and that they may or may not be reinforced by embedded cords or fabric in a manner well known to the rubber art.

Various changes may be made in any of the embodiments of the invention hereinabove specifically described without departing from or sacrificing the advantages of the invention as defined in the appended claims.

We claim:

1. A flexible coupling comprising a pair of hollow hub members for application to adjacent shafts, a pair of outer ring members each having an inturned portion, a pair of torque transmitting annuli of flexible rubber-like material each connecting one of said hub members with one of said ring members, and means arranged in said annuli and coacting with said inturned portions for releasably connecting said ring members.

2. A flexible coupling comprising a pair of hollow hub members for application to adjacent shafts, a pair of separably connected outer ring members each having an inturned flange, and a pair of torque transmitting annuli of flexible rubber-like material each connecting one of said hub members with one of said ring members, each of said annuli comprising an inner axially extended annular portion surface bonded to one of said hub portions, an outer annular portion surface bonded to one of said ring members and to the inturned flange of the latter, and an intermediate web portion connecting said inner and outer portions.

3. A flexible coupling comprising a pair of hollow hub members for application to adjacent shafts, a pair of torque transmitting annuli of flexible rubber-like material, each of the latter comprising an inner axially extended annular portion surface bonded to one of said hub members, an outer annular portion, and an intermediate conical web portion connecting said inner and outer portions, the outer portions of said annuli being connected to complete the torque transmitting connection between said hub members.

4. A flexible coupling comprising a pair of hollow hub members for application to adjacent shafts, a pair of torque transmitting annuli of flexible rubber-like material surrounding said hub members, respectively, each of said annuli having an axially extended inner portion surface bonded to one of said hub members, and a conical web extending from said inner portion, and means separably connecting the web portions of said annuli.

5. A flexible coupling comprising a pair of hollow hub members for application to adjacent shafts, a pair of torque transmitting annuli of flexible rubber-like material surrounding said hub members, respectively, each of said annuli comprising an axially extended inner portion surface bonded to one of said hub members, an axially extended outer portion, and a conical web connecting said portions, and separable means surface bonded to the outer portions of said annuli for releasably connecting the latter.

6. A flexible coupling comprising a pair of driving and driven shafts, a hub member releasably mounted on one of said shafts, a torque transmitting annulus of flexible rubber-like material having an axially extended annular portion surface bonded to said hub member, an outer annular portion, and a conical web portion connecting said first named portions, a ring surface bonded to said outer portion, and separable means releasably connecting said ring in driving relation with the other of said shafts.

7. In a flexible coupling the combination of a hub member for releasable application to a shaft, a concentric ring member radially spaced therefrom, and a torque transmitting annulus of flexible rubber-like material interposed therebetween, said annulus comprising an inner annular portion surface bonded to said hub member, an outer annular portion surface bonded to said ring, and an integral conical web portion connecting said inner and outer portions.

8. A flexible coupling comprising a pair of hub members for application to adjacent shafts, a pair of ring members radially spaced outwardly from said hub members, a pair of torque transmitting annuli of flexible rubber-like material each surface bonded to one of said hub members and one of said ring members, and separable interlocking means for releasably securing said ring members together to complete the coupling.

CARL R. REUTER.
THOMAS L. FAWICK.